United States Patent [19]
Larsson

[11] 4,030,862
[45] June 21, 1977

[54] HELICAL GEAR PUMP AND METHOD OF MANUFACTURING THE SAME

[76] Inventor: Erik Larsson, Dalagatan 86A, 113 43 Stockholm, Sweden

[22] Filed: Apr. 21, 1975

[21] Appl. No.: 569,670

[30] Foreign Application Priority Data

Apr. 22, 1974 Sweden .............................. 7405395

[52] U.S. Cl. ................................ 418/48; 418/220; 29/156.4 R; 29/156.8 R; 29/423
[51] Int. Cl.² .................... F01C 1/10; F01C 21/08; F04C 1/06; B23P 15/10
[58] Field of Search ........................... 418/48, 220; 29/156.4 R, 156.8 R, 423

[56] References Cited

UNITED STATES PATENTS

| | | | |
|---|---|---|---|
| 2,463,341 | 3/1949 | Wade ................................... | 418/48 |
| 2,553,548 | 5/1951 | Canazzi et al. ....................... | 418/48 |
| 2,874,643 | 2/1959 | Bourke ................................. | 418/48 |
| 3,603,407 | 9/1971 | Clark ................................... | 418/48 |

FOREIGN PATENTS OR APPLICATIONS

| | | | |
|---|---|---|---|
| 91,306 | 6/1959 | Netherlands ......................... | 418/48 |
| 140,005 | 4/1953 | Sweden ................................. | 418/48 |

*Primary Examiner*—John J. Vrablik
*Attorney, Agent, or Firm*—Strauch, Nolan, Neale, Nies & Kurz

[57] ABSTRACT

A helical gear pump in which the rotor is made of a wire or bar wound into a cylindrical helix. The rotor is made by twisting two wires or bars around each other, separating the two helices so formed, and using one or both of them as a rotor. The stator is made of a tube of plastics which is formed by inserting into the tube a mandrel having threads correspondng to required internal threads of the stator, causing the plastics tube to soften and applying external pressure to it to make its inside assume a shape corresponding to that of the mandrel. The mandrel is made by winding helically two wires about a third straight wire and securing the first-mentioned two wires to the third wire, all the said wires having about the same diameter as the wire of which the rotor is made.

6 Claims, 7 Drawing Figures

HELICAL GEAR PUMP AND METHOD OF MANUFACTURING THE SAME

The invention relates to a helical gear pump (also called screw pump) having a single-threaded rotor screw which is rotatable in a stator having two internal helical threads, the pitch of each stator thread being twice as large as the pitch of the rotor screw.

Helical gear pumps of this type are known since a long time. However, the prior pumps of this type suffer from certain drawbacks and disadvantages. Thus, it is difficult to attain a static balance in operation of these known pumps. Since the rotor screw while rotating about its own axis simultaneously performs a rolling movement in a direction opposite to the rotation direction, it has been common practice to connect the rotor screw with the drive shaft by means of a universal joint in order to make possible this rolling motion. However, the universal joint in a helical gear pump is not easily accessible which is a disadvantage if it needs lubricating or sterilization, and also the universal joints often have an insufficient mechanical strength. In prior helical gear pumps the "travelling cavities" in which the pumped material is transported have a flattened form which results in fibrous and solid particles having a tendency to stick and cause jamming. Moreover, the manufacture of the rotor screw for prior helical gear pumps is very costly and time-consuming.

Hitherto the rotor screw has always been manufactured by turning. However, an ordinary lathe cannot be used for this purpose but complicated special machines, e.g. of the type described in the French Pat. Spec. No. 846,489, are required. Due to their oscillating mechanisms and intermittent cutting such machines have a small production capacity. Furthermore complicated grinding machines are required to give the rotor screw sufficiently smooth surfaces. By these manufacturing methods the cross-section of the rotor screw at right angles to its longitudinal direction is given a circular form which was previously considered necessary in order to make possible the rolling of the rotor screw in the stator. A simpler manufacturing method by means of milling has been proposed in the U.S. Pat. Spec. No. 3,208,391 in which it is also shown that the rotor screw does not necessarily need to have a circular cross-section. However, the last-mentioned method also requires a following grinding, and the shape of the cavities does not essentially differ from that which can be produced by the turning method.

It is an object of the present invention to eliminate these drawbacks and disadvantages and to provide a helical gear pump which is simple to manufacture. According to the invention the helical gear pump is characterized by the rotor screw consisting of a wire or bar which is wound into a cylindrical helix, the outer diameter of the rotor screw being about twice as large as the diameter of said wire or bar.

The invention will be described more in particular in conjunction with the accompanying drawing.

Figure 3:
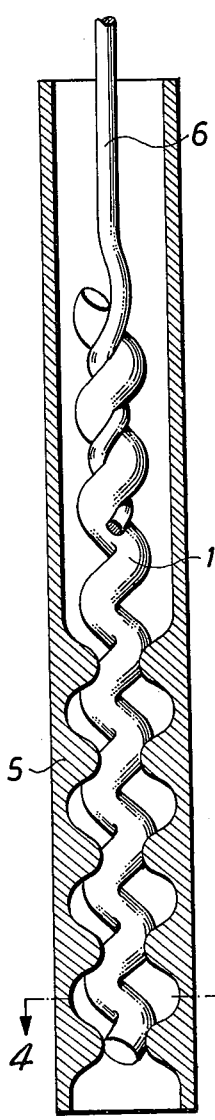
FIG. 3 shows a part of a helical gear pump made in accordance with the invention.
Figure 5:
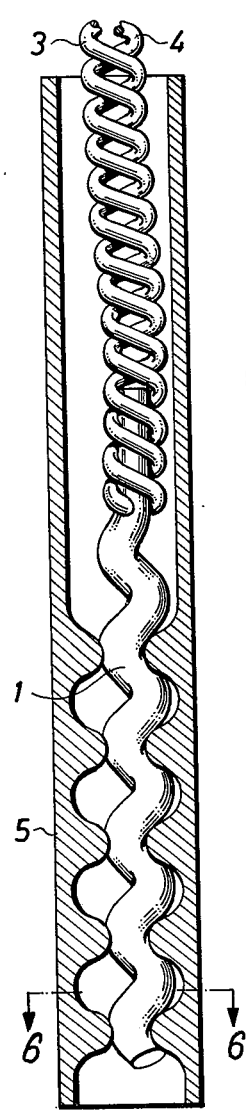

FIG. 5 like FIG. 3 shows a part of a helical gear pump made in accordance with the invention, in which the drive shaft of the rotor screw is designed and arranged in a manner different from that shown in FIG. 3.

Figure 6:
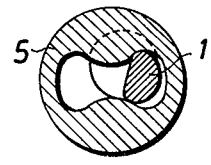

FIG. 6 shows a cross-section taken along line 6—6 in FIG. 5.

Figure 7:
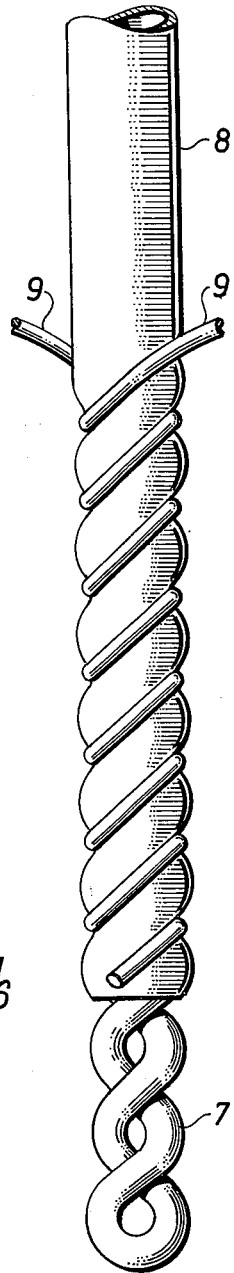

FIG. 7 illustrates a preferred method of manufacturing the stator of the helical gear pump.

Like parts are provided with like reference numerals in the various figures.

Figure 1:
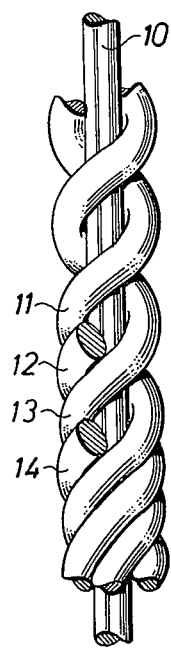
FIGS. 1 and 2 illustrate the basic idea of the invention.
Figure 2:

Referring now to FIG. 1, 10 designates a round bar having a certain diameter. If four other bars 11, 12, 13 and 14 having the same diameter as the bar 10 are tightly wound around bar 10, then each of the bars 11 – 14 forms a helix with a pitch which is about 5.2 times as large as the diameter. Thus, if bars 10 – 14 have a diameter of 6 mm the said pitch will be about 32 mm. If two bars 1 and 2 having the same diameter are wound about each other with the least possible pitch as shown in FIG. 2, this pitch will be half of the pitch of one of the helices shown in FIG. 1. If wires 1 and 2 have a diameter of 6 mm, the pitch will be about 16 mm. If every second of the helically wound bars 11 – 14, e.g. bars 12 and 14 are screwed away from the bar 10 and the core bar 10 is pulled out of the remaining two helically wound bars, e.g. 11 and 13, and the last-mentioned bars are maintained in their position in relation to each other, and one of the bars 1 and 2 of FIG. 2 is inserted in the space previously occupied by bar 10, it will be found that the inserted helix 1 makes a tight contact with the two other helices (11 and 13) and can rotate in relation to these at the same time as it performs a rolling movement in the opposite direction in the same manner as in so called monopumps. Thus, hereby a possibility is revealed of forming both the rotor and the stator by simple means.

A frictionless rolling movement is however not obtained if the pitch is the least possible, and therefore this pitch should be made larger than the least possible one. Trial manufacture using wire or bars having diameters ranging from 1 to 20 mm has shown that in this manner a rotor screw can be manufactured in a fraction of the time required to manufacture the rotor screw by means of cutting processes.

It will be seen that if the two wires 1 and 2 which are wound about each other as shown in FIG. 2, are separated from each other, each of them can be used as a rotor screw in a helical gear pump. However, one of the helices thus formed, e.g. 2, may then be used as a winding mandrel for other wires or bars. The wire or bar forming the rotor screw can for instance be made of steel or plastic. The pitch should be larger than the least possible, and the ratio of the outer diameter of the rotor screw to the diameter of the wire or bar can be allowed to be somewhat larger than 2:1 if the internal threads of the stator are correspondingly formed.

A minimum pitch of the rotor screw is of advantage in pumps for the pumping of liquids having a high viscosity or liquids containing fibrous material or solid particles. If the pump according to the invention is to be used for the pumping of only water or other pure liquids, the pitch may be made considerably larger.

It should be noted that the rotor screw made in accordance with the invention as distinct from a screw having a circular cross-section must have at least two stages (turns) because the path of rolling contact becomes helical. For several reasons it is however recommended that the number of turns be made larger than two. In comparison with pumps of other type all helical gear pumps possess the advantage that they can be made multi-staged in a single unit in order to reduce the return flow and to increase the pressure. The rotor according to the invention can be made with 5, 6 or still more turns without any appreciable additional cost. The cost will rather be less, since less precision in the manufacture is required if the number of turns is increased.

Figure 4:
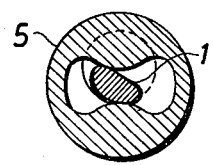
FIG. 4 shows a section taken along line 4—4 in FIG. 3.

FIGS. 3 – 5 show a rotor 1 fitted within a stator 5. FIG. 3 also shows a drive shaft 6 for the rotor 1. This drive shaft consists of a wire having about half as large a diameter as the wire 1. The drive shaft 6 (connecting rod) is wound some turns about the portion of the rotor 1 which is located above the threaded portion of the stator 5. The shaft 6 may be attached to the rotor 1 by soldering, by means of a pin or by means of glueing. If the shaft 6 and the rotor 1 are made of plastic they are preferably glued to each other by means of an adhesive of the epoxy type. Thus, no universal joint is required to connect the shaft 6 with the rotor 1. This is the case particularly if the shaft 6 has a great length, e.g. 30 – 40 times the diameter of the rotor, which is usually the case in helical gear pumps which are to be used as well pumps, bilge pumps, barrel exhaust pumps, pumps for the cooling fluid in machine tools and the like.

If the distance between the rotor and the drive motor is small, the transmission of power can be effected by means of two or more resilient wires 3 and 4 which are helically wound as shown in FIG. 5. The drive shaft formed by the wires 3 and 4 is very resilient, and therefore no universal joint is required although the distance between the drive motor and the rotor is small.

If the rotor 1 is made of wire having a small diameter (4 mm or less) the rotor and the drive shaft are preferably made in one piece, even though the drive shaft hereby becomes oversized, for the diameter of the drive shaft never needs to be larger than about half of the diameter of the wire forming the rotor screw.

As will be seen from FIGS. 4 and 6 the threads of the stator in a cross-section at right angles to its longitudinal axis will have the form of a dumb-bell or an oval compressed at the center, the narrowest portion of the cross-section having a width is equal to or larger than the diameter of the wire or rod forming the rotor screw 1.

The stator 5 of rubber, plastic or metal can be manufactured in known manner by molding about a double-threaded forming mandrel or by screwing a double-threaded forming mandrel under heating into a thick-walled plastic tube. When this method of manufacture is used, the forming mandrel should preferably be made by milling or turning.

A new method of manufacturing the stator is illustrated in FIG. 7. Two interconnected helices 7 encircling a core bar (not shown) are inserted in a relatively thin-walled plastic tube 8. While the plastic tube 8 is heated by means of hot air or liquid two steel helices 9 are screwed onto the tube. The two helices 9 are so dimensioned that they depress the walls of tube 8 against the core bar. When the plastic tube has cooled the outer forming helices are screwed off, and the formed stator is screwed off the mandrel 7 by means of a suitably formed spanner which is applied to the lower end of tube 8.

The pressure necessary to deform the plastic tube 8 so that its inside is pressed against the mandrel 7 can also be produced by winding plastic wires around the tube or by hydraulic means, e.g. by means of a hot liquid under pressure.

The mandrel 7 can be formed by milling or turning. However, it may also be formed in the manner illustrated in FIG. 1, especially if it is to have relatively small dimensions. Two wires or rods 11 and 13 are wound about a straight bar or rod 10 having the same diameter as the wires 11 and 13. The wires 11 and 13 may consist of the two legs of a single wire bent in U-shape, so that the two helices formed by wires 11 and 13 will be interconnected at one end by a loop as shown at 7 in FIG. 7. The wires 11 and 13 are then fixed to the core bar 10. This fixation can be effected e.g. by means of soldering. The solder should then be caused to fill the acute tangent angles between wires 11 and 13 on one hand and the core bar 10 on the other hand, so that the groove formed between wires 11 and 13 will have a rounded bottom.

An oscillating rotor causes a lack of static balance. This is of no consequence when the rotational speed is high and if the elastic stator is mounted in a pump casing, the centrifugal forces, exerted by the rotor added to the pumping pressure strive to expand and deform the stator. To counteract this effect it has previously been proposed to mount the stator so that it can oscillate within the pump casing, therey permitting the stator to perform half the oscillation and so to speak swing away from the deformation pressure. At least for pumps for the above-mentioned applications a pump casing is completely superfluous, and if the stator tube has the same weight as the rotor and drive shaft (connecting rod), each will perform half the oscillation, that is a static balance is attained. If the rotor of a pump for water has the density 1, static balance is attained irrespective of the weight of the stator.

When the helical gear pump is used as a deep well pump with the drive motor located at the ground surface, the drive shaft may be located either within or outside the tube. If the pump is small and is suspended by an undivided tube of plastics, it is preferable to let the shaft extend from a joint located about half a meter from the rotor screw at the outside of the tube in suitably spaced, self-lubricating bushings secured to the tube. Since a "tubular" helical pump of the described type with an external diameter of only 25 – 27 mm has the same capacity as an underwater motor-driven pump with a diameter of 100 mm, the invention also results in a considerable reduction of the costs for drilling holes.

What I claim is:
1. Helical gear pump having a single-threaded rotor screw which is rotatable in a stator which is internally double-threaded, each stator thread having twice as large pitch as the thread of the rotor screw, said rotor screw having a configuration substantially identical to that obtained by winding a wire or bar having a uniform, circular cross-section into a cylindrical helix, the outer diameter of said rotor screw being about twice as large as the diameter of said wire or bar, said bar or wire having a non-circular configuration within a cross-section plane drawn normal to the central axis defined by said cylindrical helix.

2. Helical gear pump as claimed in claim 1, characterized in that the pitch of the helix forming the rotor screw is equal to or larger than the pitch obtained when two wires or bars having the same diameter are wound about each other with the least possible pitch.

3. Helical gear pump as claimed in claim 1, characterized in that a drive shaft for the rotor screw is made integral with the rotor screw and has such a length that it permits the required bending when the rotor screw rotates.

4. Helical gear pump as claimed in claim 1, characterized in that the threads of the stator in a cross-section at right angles to the longitudinal axis of the stator have the shape of an oval compressed at its center, so that the central portion is narrower than the adjacent portions of the section, the narrowest portion of the cross-section having a width which is equal to or larger than the diameter of the wire or bar of which the rotor screw is made.

5. Helical gear pump as claimed in claim 1, characterized in that a drive shaft for the rotor screw is rigidly secured to the rotor screw and is made of a wire or bar having a less diameter than the wire or bar of which the rotor screw is made.

6. Helical gear pump as claimed in claim 5, characterized in that the drive shaft for the motor screw is made of one or more helically wound wires which are secured to an extension of the rotor screw.

* * * * *